United States Patent [19]

Carlson, deceased

[11] 4,368,756
[45] Jan. 18, 1983

[54] CHECK VALVE

[75] Inventor: Donald E. Carlson, deceased, late of Highland Park, Ill., by Myrna N. Carlson, executrix

[73] Assignee: Mark Controls Corporation, Lake Zurich, Ill.

[21] Appl. No.: 223,991

[22] Filed: Jan. 12, 1981

Related U.S. Application Data

[63] Continuation of Ser. No. 969,128, Dec. 13, 1978, abandoned.

[51] Int. Cl.³ .............................................. F16K 15/06
[52] U.S. Cl. .................................... 137/541; 137/543; 137/543.13
[58] Field of Search ........... 137/541, 542, 543, 543.13, 137/543.15, 533.21, 533.23, 533.25, 533.29, 533.21, 533.17, 543.19

[56] References Cited

U.S. PATENT DOCUMENTS

| | | | |
|---|---|---|---|
| 469,853 | 3/1892 | Gibson | 137/543.13 |
| 491,957 | 2/1893 | Welsh | 137/533.29 |
| 2,197,455 | 4/1940 | Volpin | 137/533.21 |
| 2,241,758 | 5/1941 | Baldine | 137/541 |
| 2,372,629 | 3/1945 | Nelson | 137/533.23 |
| 2,844,164 | 7/1958 | Robbins | 137/543.13 |
| 3,209,777 | 10/1965 | Salisbury | 137/543.13 |
| 3,800,824 | 4/1974 | Medina | 137/541 |
| 3,937,249 | 2/1976 | Suey | 137/543.13 |

Primary Examiner—H. Jay Spiegel
Attorney, Agent, or Firm—Dressler, Goldsmith, Shore, Sutker & Milnamow, Ltd.

[57] ABSTRACT

A guide for a poppet in a check valve includes an annular, cylindrical rim and a guide hub concentric therewith. At least one web extends radially from the guide hub to the rim. The outer periphery of the rim includes at least one projection defined at a position angularly spaced from the web. The projection is engaged by the inner periphery of the check valve such that the guide is held within the check valve, with a stem on the poppet extending through the guide hub. The guide hub includes at least one lug to engage the stem to prevent rotation of the stem relative to the check valve. The guide is formed of a smooth bearing material, and the rim thereof is capable of flexing, in the area where the projections are provided.

10 Claims, 4 Drawing Figures

CHECK VALVE

This is a continuation of application Ser. No. 969,128, filed Dec. 13, 1978, now abandoned.

BACKGROUND OF THE INVENTION

A. Field of the Invention

The present invention relates generally to valves for controlling the flow of fluid in a fluid system and particularly to an improved poppet stem guide for controlling the movement and location of a poppet stem in a check or relief valve.

B. Description of the Prior Art

Check valves or relief valves are well known devices for controlling the flow of fluid in a fluid system. One common characteristic of many prior art check valves is their relatively complex and thus expensive construction. Examples of typical prior art check valves are the devices disclosed in U.S. Pat. Nos. 2,594,641, 3,288,167, 3,334,659, and 3,473,561.

One component of these prior art check valves that adds substantial cost both in material and assembly is the poppet guide. One such guide is disclosed in U.S. Pat. No. 3,800,824. Poppet guides serve to guide and locate the poppet within the check valve while minimizing flow restriction. Typically, prior art guides are fabricated from material that is substantial in cost and expensive to assemble within the check valve and are often subject to jamming after short periods of use.

SUMMARY OF THE INVENTION

The present invention is directed to a new and improved poppet guide that is employed in a check valve, or the like. The check valve includes a one-piece body having an internal bore that is in communication with the fluid inlet and fluid outlet of the valve. A valve seat is defined within the bore and a poppet valve is positioned to engage the valve seat to provide one-way flow through the check valve.

The guide includes an annular cylindrical rim and a co-axial guide hub defined within the rim. Radial webs or spokes extend from the guide hub to the annular rim. There is at least one projection defined on the outer periphery of the rim that is diametrically opposed from the radial webs.

In one type of check valve, the projections provide an interference fit against the inner circumferential periphery of a machined portion of the bore once the poppet guide is positioned in the bore of the check valve. In a second type of check valve, ribs defined within a machine portion of the bore of the valve are straddled by the projections and the outer peripheral surface of the rim between the projections engages the ribs to provide a resistance or interference fit holding the guide within the finished valve bore.

The guide hub includes one or more lugs molded, or otherwise suitably formed, on its inner peripheral surface and the stem of the poppet valve is of a polygonal shape, such that the lugs engage at least one of the sides of the valve stem allowing axial movement while preventing rotation of the valve stem relative to the valve.

Valves having a guide in accordance with the present invention have many advantages. As compared to prior art valves, they are simple, and relatively inexpensive, both in terms of material cost and assembly. The guide is held against movement relative to the valve, and the stem is held against rotation relative to the guide, thereby minimizing wear and prolonging the life of the valve. Sufficient clearance is provided between the guide hub and the stem to minimize the possibility of particulate matter jamming therebetween. And, the guide itself provides for streamlined fluid flow therethrough.

DESCRIPTION OF THE PREFERRED EMBODIMENTS

Figure 1:
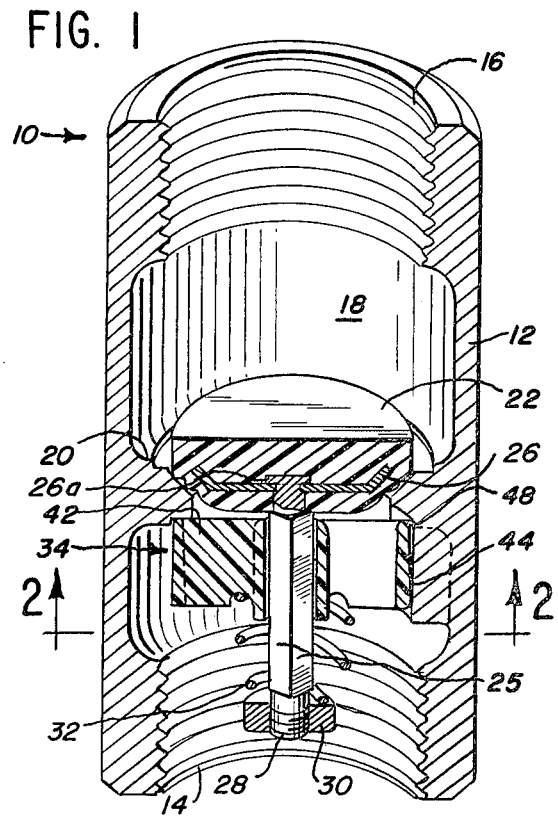
FIG. 1 is a cut-away perspective view of a first valve including a poppet guide constructed in accordance with the principles of the present invention.

While this invention is susceptible of embodiment in many different forms, there is shown in the drawings and will herein be described in detail a preferred embodiment in accordance with the present invention, and with the understanding that the present disclosure is to be considered as an exemplification of the principles of the invention and is not intended to limit the invention to the specific embodiments illustrated and described.

Figure 2:
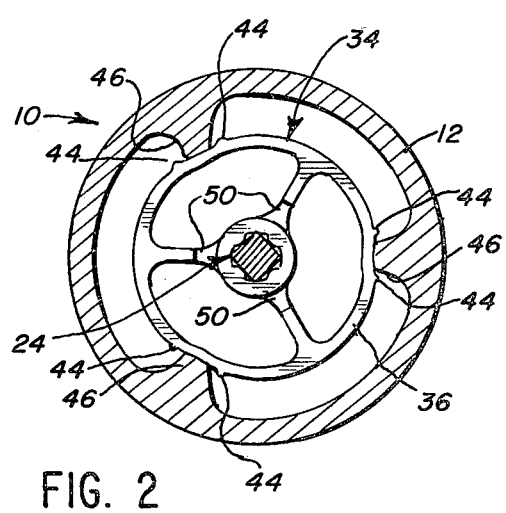
FIG. 2 is a view taken along line 2—2 of FIG. 1.
Figure 4:
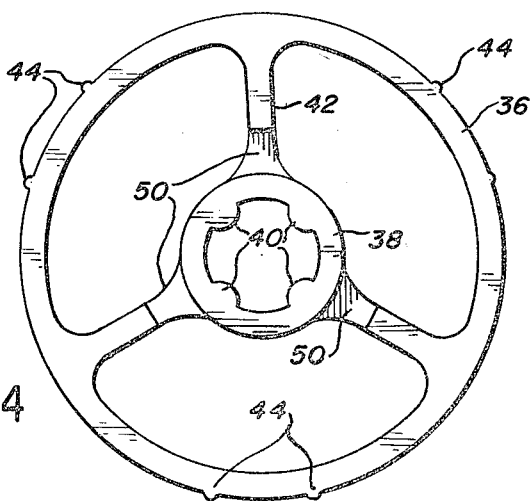
FIG. 4 is an enlarged end view of an embodiment of the poppet guide of the present invention.

Having reference to the drawing and initially to FIGS. 1, 2, and 4, there is illustrated a new and improved check valve and poppet guide constructed in accordance with the principles of the present invention. The check valve is designated as a whole by the reference numeral 10 and is used to control the flow of fluid in a fluid system, and specifically, to allow unidirectional flow in the fluid system. The check valve 10 includes a novel poppet guide that functions to guide a poppet stem within the check valve 10.

The check valve 10 includes a body 12 having an inlet 14 and an outlet 16. The inlet 14 and the outlet 16 are threaded to allow the valve 10 to be easily coupled to a pipeline or similar fluid system. Defined between the inlet 14 and the outlet 16 and within the body 12 is an elongated bore 18 through which fluid flows when the valve 10 is open. The body 12 includes an annular valve seat 20 defined on the inner peripheral surface of the bore 18. The check valve 10 further includes a poppet 22 for forming a fluid-tight sealing engagement with the valve seat 20. Poppet 22 is preferably formed of an elastomeric material. When the poppet 22 is positioned in sealed engagement with the valve seat 20, back flow of fluid through the check valve is prevented. When the poppet 22 is in an open position spaced from and out of sealing engagement with the valve seat 20, flow of fluid through the check valve 10 from the inlet 14 through the outlet 16 is permitted.

A poppet stem generally designated by reference numeral 24 extends longitudinally through the bore 18 and is secured to the poppet 22. The poppet stem 24 is of a polygonal configuration in cross section, and in the embodiment illustrated, is of a square cross-sectional configuration having flat sides 25. The poppet stem 24 is utilized to control the movement of the poppet 22 with respect to the valve seat 20. The poppet stem 24 may be connected to the poppet 22 by any suitable means, such as, by having an upper flattened portion 26a embrace a metal stiffening element 26, and molding the poppet around the end of the poppet stem including the stiffening element 26.

The poppet stem 24 includes a threaded end portion 28 for receiving a threaded lock nut 30. The lock nut 30 serves as a lower limit, or shoulder, for one end of a compression spring 32, and the opposite end of spring 32 bears against a poppet guide 34, to be hereafter described in detail. The compression spring 32 provides the necessary bias to maintain the poppet 22 in sealing engagement with the valve seat 20. When force exerted by the pressure of the fluid in the check valve 10 against the undersurface of the poppet 22 exceeds the opposing bias force provided by the compression spring 32, the poppet 22 disengages from the valve seat 20 to permit fluid to flow through the check valve 10, and such fluid flow will continue so long as the fluid pressure at the inlet side of the check valve exceeds the bias of spring 32. The bias force imparted by the compression spring 32 may be adjusted by varying the longitudinal position of the threaded nut 30 on the threaded end portion 28 of the valve stem 24. Thus, the operation of the check valve 10 can be easily adjusted to permit fluid flow at any desired fluid pressure.

In accordance with an important feature of the present invention, poppet guide 34 provides for both positioning the poppet stem 24 within the bore 18 of the check valve 10, and for controlling the movement of the stem 24 along a longitudinal axis coincident with the central longitudinal axis of the bore 18. Guide 34 is formed of a flexible smooth surface bearing material, such as, DELRIN. In addition, poppet guide 34 prevents rotation of the poppet 22 and the stem 24 relative to the body 12 of the check valve 10. By controlling the position and movement of the poppet stem 24, the poppet guide 34 controls the position and movement of the poppet 22 to cause the poppet 22 to engage the valve seat 20 in a proper alignment. And, by preventing the valve stem from rotating relative to the valve body, wear resulting from excessive movement is minimized, thus prolonging the useful life of the valve.

In accordance with an important advantage of the present invention, and as can be best seen from FIG. 4, the poppet guide 34 includes a thin resilient rim 36 of a tapered cross section to define a fluid flow passage that is streamlined, i.e., progressively increasing in size, to reduce the flow resistance of the rim 36. The poppet guide 34 also includes a cylindrical hub 38 that is coaxial with the rim 36, and hub 38 includes on its inner peripheral surface one or more lugs 40 that extend along a portion of the entire length of the hub 38.

The hub 38 and rim 36 are joined and spaced from each other by radially extending webs or spokes 42 that are of a cross-sectional configuration substantially similar to that of the rim 36 so as to further streamline the fluid flow passages and reduce resistance to flow through the guide 34 and along the bore 18. In a most preferred embodiment, both surfaces of rim 36 and webs 42 are uniformly tapered.

The stem guide 34 in its entirety is fabricated, by molding, or the like, from material that allows some deformation of the rim 36 during assembly of the guide 34 into the check valve 10. The guide 34 is of a diameter relative to the diameter of a machined intermediate portion of the bore 18 such that once the guide 34 is positioned within the bore 18, it remains slightly compressed, thereby producing a force that assists the interference fit of the guide 34 in the bore 18 in holding the guide 34 within the machined portion of the bore 18.

To prevent the guide from rotating within the check valve 10, the pairs of circumferentially spaced, axially extending lugs or projections 44 defined on the outer peripheral surface of the rim 36. In the preferred embodiment illustrated, the lugs 44 are located approximately at a point on the rim 36 diametrically opposed to the point of intersection of the webs 42 with the rim 36. This location of the lugs 44 allows maximum deformation of the rim 36 if force is applied at or near the lugs 44, as when the guide is inserted in the valve body.

To maintain the valve guide 34 within the check valve 10, the valve 10 includes legs or ribs 46 defined on the inner peripheral surface of the bore 18. To assemble the poppet guide 34 in the check valve 10, the poppet guide 34 is positioned within the inlet 14 of the check valve 10 by moving the guide 34 longitudinally within the bore 18 so that the outer periphery of rim 36 between the projections 44 engages the apex of the legs 46. The apex of the legs 46 defines a cylindrical area of a diameter slightly less than the diameter of the outer periphery of the rim 36. Accordingly, as the poppet guide 34 is moved further into the machined intermediate portion of bore 18, ribs 46 exert an inward compressive force, and a slight inward deformation of the rim 36 at the interface of the rim 36 and the legs 46 occurs. Once the poppet guide 34 is fully positioned within the machined portion of bore 18, the downstream end of the valve guide 34 abuts against a shoulder 48 machined within bore 18.

Once assembled, there is a significant force due to the deformation of the rim 36 holding the valve guide 34 in position. This force, together with the confining action of ribs 44, is sufficient to prevent movement of the valve guide 34 by the swirling motion or influence of fluid flowing through the check valve 10. Consequently, wear due to rotation of the valve guide 34, within the machined portion of bore 18, as is prevalent in prior art valve guides, is prevented.

To complete the assembly of the check valve 10, the poppet stem 24 is inserted axially into the hub 38 such that the lugs 40 face the sides 25 of the poppet stem 24, and spring 32 is positioned around the valve stem 24, with one end seated within a set of grooves 50 defined in the webs 42 of the valve guide 34. The other end of the spring 32 seats against the lock nut 30 once it is threaded on the end 28 of the stem 24. The inner diameter of the hub 38 is slightly larger than the transverse dimension of the valve stem 24, such that the valve stem 24 may move freely in a longitudinal direction within the intermediate portion of bore 18 and the hub 38 without interference. This allows free movement of the poppet 22 under the influence of fluid pressure and the spring 32 and reduces the likelihood of jamming of the stem 24 within the hub 38 due to sand, or other particulate matter that may be entrained in the fluid. Rotation of the stem 24, however, is prevented due to the engagement of the lugs 40 with the sides 25 of the stem 24.

Figure 3:
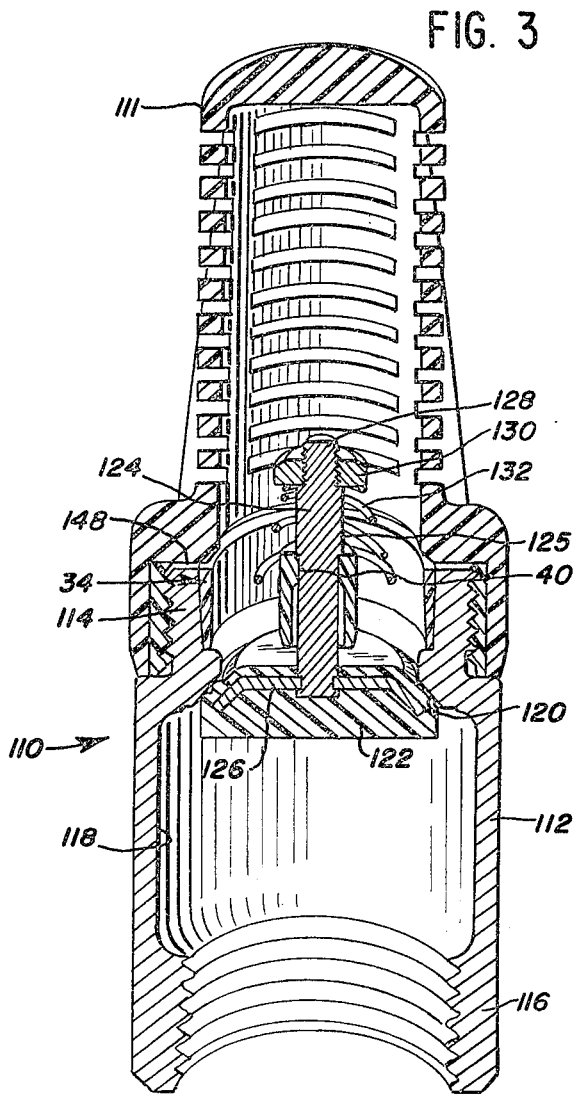
FIG. 3 is a second valve including a poppet guide constructed in accordance with the principles of the present invention.

The poppet guide 34 may also be used in a second type of check valve, such as the check valve 110 illustrated in FIG. 3. The check valve 110 is of the type that may be used at the inlet of a fluid system and includes a screen 111 that is secured to the inlet 114 of the check valve 110 to filter or screen particles and prevent their entry into the fluid system.

The check valve 110 includes a body 112 having an inlet 114 at one end and an outlet 116 at the other end. The inlet 114 is externally threaded to allow the attachment of the screen 111. The outlet 116 is internally threaded to allow coupling to the fluid system, such as a pipe line.

The check valve 110 also includes an internal bore 118 and a valve seat 120 substantially similar to the corresponding components of the check valve 10. The check valve 110 further includes a poppet 122 for forming a fluid-tight sealing engagement with the seat 120. In a sealed engagement, the poppet 122 and the valve seat 120 prevent flow of fluid from the outlet 116 to the inlet 114 of the check valve 110. In a non-sealing engagement, or when disengaged, the poppet 122 and the valve seat 120 permit the flow of fluid through the check valve 110.

A poppet stem 124 is securely attached to the poppet 122 and extends longitudinally through the bore 118 of the check valve 110 and into screen 111. In a manner substantially similar to the poppet stem 24. in the check valve 10, the poppet stem 124 is utilized to control the movement of the poppet 122 with respect to the valve seat 120. The poppet stem 124 is connected to the poppet 122 in any suitable manner, such as by molding the poppet about an enlarged stiffener 126 at the end of the stem.

The poppet stem 124 is polygonal in configuration and includes sides 125 that, in a preferred embodiment, may be of a configuration substantially similar to the valve stem 24. The poppet stem 124 also includes a threaded end 128 to which a lock nut 130 may be threaded to serve as a shoulder for the spring 132 once the spring 132 is mounted around the stem 124.

The check valve 110 differs from the check valve 10 in that the check valve 110 does not include cast legs or ribs 46, but rather the inlet 114 is of a diameter slightly smaller than the diameter of the poppet guide 34. Consequently, to assemble the valve guide 34 in the check valve 110, the valve guide 34 is press-fitted, or pushed, into the inlet 114 against the shoulder in a manner such that the lugs 44 on the outer peripheral surface of the rim 36 engage the inner peripheral surface of the inlet 114 slightly deforming the rim 36. This slight deformation provides a holding force imparted to the inner peripheral surface of the inlet 114 resulting in a securement of the poppet guide 34 within the inlet 114 with sufficient force to prevent movement of the poppet guide 34 as a result of the swirling motion of fluid flowing through the check valve 110.

To complete the assembly of the check valve 110, poppet stem is inserted through the poppet with the lugs 40 engaging surface 125, and spring 132 is positioned so that one end of the spring 132 engages the slots 50 defined on the webs 42. The lock nut 130 may then be threaded on the end 128 to serve as a shoulder for the other end of the spring 132. The screen 111 may then be threaded on the external threads defined on the inlet 114.

During operation of the check valve 110 the poppet stem 124 may slide longitudinally relative to the hub 38 and in a direction toward the outlet 116. The lugs 40, prevent rotation of the stem 124 within the bore 118.

In view of the above teachings, it may be understood that the poppet guide 34 due to its flexible material and ease of manufacture is easily assembled within several different types of check valves, such as the check valves 10 and 110, and is less subject to wear since it cannot be rotated within the check valve due to the influence of the swirling motion of fluid. Many modifications and variations of the present invention are possible in light of the above teachings. Thus, it is to be understood that, within the scope of the appended claims, the invention may be practiced otherwise as specifically described.

What is claimed and desired to be secured by Letters Patent of the United States is:

1. A valve for controlling fluid flow in a fluid system comprising:
   an elongated body including an internal bore and a fluid inlet and a fluid outlet in fluid communication with said bore;
   a valve seat defined by said bore;
   a valve element adapted to move longitudinally in said bore and to engage said valve seat in the valve closed condition, said valve element including a valve stem; and
   means for guiding the longitudinal movement of said valve stem in said bore, said guiding means including a continuous annular flexible rim adapted to be inserted in said bore and to be frictionally engaged thereby, said rim having axially spaced first and second ends, a guide hub for encircling said stem, and a plurality of circumferentially spaced radial webs extending from said hub to said rim, said webs being disposed between the first and second ends of said rim, said rim having a predetermined effective outer diameter that is larger than the effective inner diameter of said bore prior to insertion of said guiding means into said bore to define an interference fit therebetween, the engagement between said bore and said rim cooperating to deform said rim inwardly in a portion thereof spaced angularly from said radial webs to retain said guiding means against movement relative to said bore, said webs remaining substantially undeformed so as to retain said guide hub in position to receive the stem of said valve element.

2. The valve claimed in claim 1 wherein said guiding means further comprises at least one pair of projections defined on the outer periphery of said rim and diametrically opposed from one of said webs.

3. The valve claimed in claim 2 wherein said body further includes at least one rib defined on the periphery of said bore, said rib engaging said rim between said one pair of projections.

4. The valve claimed in claim 1 further comprising at least one projection defined on the outer periphery of said rim at a position angularly spaced from the point of joining of said webs and said rim.

5. The valve claimed in claim 4 wherein said bore includes at least one radial rib defined on the inner periphery thereof, said rib engaging said rim of said guide means at a point adjacent said projection.

6. The valve claimed in claim 1 wherein said valve stem is of a polygonal cross-sectional configuration and said hub includes at least one lug defined on the inner peripheral surface thereof and longitudinally extending along at least a portion of said hub, said lug engaging a side of said stem upon insertion of said stem through said hub.

7. The valve claimed in claim 6 wherein said hub is a hollow generally cylindrical member having an inner diameter larger than the cross-sectional dimension of said stem thereby providing a loose fit of said stem in said hub.

8. The valve set forth in claim 1 wherein said stem is of a polygonal configuration, said hub includes at least one lug defined on the inner peripheral surface thereof for engaging a side of said valve stem.

9. A valve for controlling fluid flow in a fluid system comprising:
an elongated body including an internal bore and a fluid inlet and a fluid outlet in fluid communication with said bore, said body having at least one rib defined on the periphery of said bore;
a valve seat defined in said bore;
a valve element adapted to move longitudinally in said bore and to engage said valve seat in the valve closed condition, said valve element including a valve stem; and
means for guiding the longitudinal movement of said valve stem in said bore, said guiding means including an annular flexible rim adapted to be inserted in said bore and to be frictionally engaged thereby, a guide hub for encircling said stem, and at least one radial web extending from said hub to said rim, at least one pair of projections defined on the outer periphery of said rim and diametrically opposed from one of said webs, said rib on said body engaging said rib between said one pair of projections, the effective outer diameter of said rim being larger than the effective inner diameter of said bore to define an interference fit therebetween, said bore thereby being effective to deform said rim to retain said guiding means against movement relative to said bore.

10. A valve for controlling fluid flow in a fluid system comprising:
an elongated body including an internal bore and a fluid inlet and a fluid outlet in fluid communication with said bore, said bore having at least one radial rib defined on the inner periphery thereof;
a valve seat defined in said bore;
a valve element adapted to move longitudinally in said bore and to engage said valve seat in the valve closed condition, said valve element including a valve stem; and
means for guiding the longitudinal movement of said valve stem in said bore, said guiding means including an annular flexible rim adapted to be inserted in said bore and to be frictionally engaged thereby, a guide hub for encircling said stem, and at least one radial web extending from said hub to said rim, at least one projection defined on the outer periphery of said rim at a position angularly spaced from the point of joining of said web and said rim, said rib on said bore engaging said rim of said guide means at a point adjacent said projection, the effective outer diameter of said rim being larger than the effective inner diameter of said bore to define an interference fit therebetween said bore thereby being effective to deform said rim to retain said guiding means against movement relative to said bore.

* * * * *